United States Patent [19]

Cerruti

[11] 4,327,352

[45] Apr. 27, 1982

[54] MONITORING APPARATUS FOR A MOTOR VEHICLE

[75] Inventor: Eraldo Cerruti, Turin, Italy

[73] Assignee: Fiat Auto S.p.A., Turin, Italy

[21] Appl. No.: 182,252

[22] Filed: Aug. 28, 1980

[30] Foreign Application Priority Data

Sep. 28, 1979 [IT] Italy .............................. 68883 A/79

[51] Int. Cl.[3] ............................................... B60Q 1/00

[52] U.S. Cl. ................................ 340/52 F; 340/52 R; 340/60; 340/521

[58] Field of Search ..................... 340/52 R, 52 F, 60, 340/517, 520, 521

[56] References Cited

U.S. PATENT DOCUMENTS 3,906,440 9/1975 Haupt .................................... 340/60

*Primary Examiner*—Alvin H. Waring

*Attorney, Agent, or Firm*—Sughrue, Mion, Zinn, Macpeak & Seas

[57] ABSTRACT

Monitoring apparatus which comprises a plurality of monitoring circuits arranged to indicate the malfunctioning of various components and systems for a motor vehicle. These warning circuits include a generator warning circuit and an oil-pressure warning circuit. To prevent activation of the generator and oil-pressure warning circuits when the vehicle ignition is turned on but the vehicle engine is not running, a respective switching device is inserted in each circuit. The switching device controlling activation of the generator warning circuit is arranged to activate the latter only when the engine oil pressure reaches a level indicating that the engine is running. The switching device controlling activation of the oil-pressure warning circuit is arranged to activate the latter only during operation of the generator. With this arrangement when the vehicle ignition is initially turned on the warning lights of the generator and oil pressure warning circuits will not be illuminated as generally happens. Preferably, a green indicator light is provided which is arranged to light up when the apparatus detects no faults.

11 Claims, 1 Drawing Figure

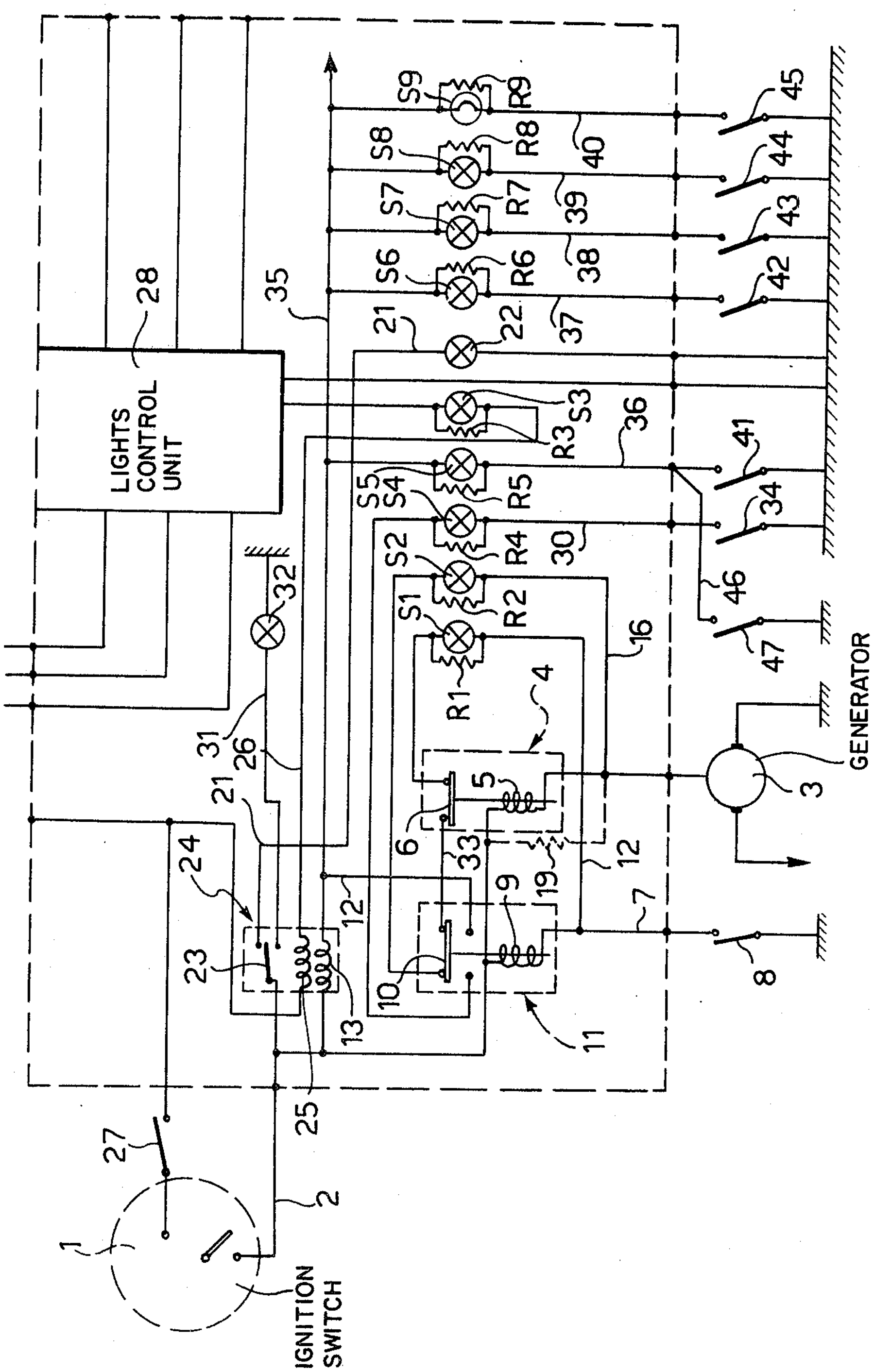
LIGHTS CONTROL UNIT
GENERATOR
IGNITION SWITCH

MONITORING APPARATUS FOR A MOTOR VEHICLE

The present invention relates to monitoring apparatus for providing an indication of the malfunctioning of various components and systems of a motor vehicle.

In recent years there has been a trend in automobile technology to provide apparatus of increasing complexity to monitor the funcioning of the basic components and systems installed in a motor vehicle, such as for example, the headlamps, the braking system, and the battery.

Generally the monitoring apparatus includes a generator warning light and an oil pressure warning light which are mounted on the vehicle dashboard together with various other warning lights. Upon turning on of the vehicle's ignition switch but prior to start up of the engine, the generator warning light and oil pressure warning light will normally light up which can cause confusion since in fact their illumination when the engine is not running is for test purposes only; the confusion is often aided by making the generator and oil pressure warning lights the same colour as the other warning lights, that is, red.

Accordingly, it is an object of the present invention to provide monitoring apparatus which after being activated by turning on of the vehicle master switch by the ignition key but prior to start up of the engine, does not light up the generator and oil pressure warning lights (except in certain failure modes of the apparatus itself).

This object is achieved in accordance with the present invention by the provision of monitoring apparatus comprising:

an oil-pressure warning circuit including a first warning light and an oil-pressure monitoring switch arranged to monitor the engine oil pressure, the monitoring switch being operative, whenever the oil-pressure warning circuit is activated, to cause energization of the first warning light upon the engine oil pressure falling below a predetermined operating pressure, a generator warning circuit including a second warning light and control means controlling energization of the second warning light, the generator warning circuit being so arranged that when activated the non-operation of the generator is indicated by energization of the second warning light, a first controllable switching device switchable between first and second states in the former of which the device is arranged to activate the oil-pressure warning circuit, the first switching device being controlled by the control means of the generator warning circuit to be in its first state only during running of the vehicle engine as indicated by the operation of the generator, and a second controllable switching device switchable between first and second states in the former of which the second switching device is arranged to activate the generator warning circuit, the second switching device being controlled by the oil-pressure monitoring switch to be in its first state only during running of the vehicle engine as indicated by the presence of said predetermined oil pressure.

With this arrangement the generator warning circuit and oil-pressure warning circuit will only be activated when the vehicle engine is running. The monitoring apparatus will generally be provided with a plurality of further warning circuits and a green indicator light is preferably provided which is arranged to be energized only when all the warning lights are extinguished.

Monitoring apparatus embodying the invention will now be particularly described, by way of example, with reference to the accompanying drawing the sole FIGURE of which is a circuit diagram of the apparatus.

The monitoring apparatus shown in the drawing includes nine warning circuits each arranged to monitor the operation of a particular component or system of the associated motor vehicle and to light up a corresponding warning light S1 to S9 upon malfunctioning of the monitored component or system. The warning lights S1 to S9 are mounted either on a panel secured to the vehicle dashboard or directly on the dashboard itself. In addition, there is also provided a green indicator light 22 arranged to be energized when all monitored components and systems are correctly functioning, and a repeater warning light 32 arranged to be energized when any one or more of the monitored components or systems malfunctions.

Generally, each warning circuit comprises in addition to its associated warning light S1–S9, a two-state monitoring switch responsive to the malfunctioning of the corresponding monitored component or system to change its state and cause illumination of the associated warning light. However, for the generator warning circuit 16 to be described more fully hereinafter, the generator 3 itself is used as its own monitoring switch since when correctly functioning the generator output can be used to block the vehicle power supply voltage used to drive the monitoring apparatus and thereby effectively provide an open circuit state for the generator warning circuit; this state changes to a closed one when the generator 3 is stationary since the generator 3 ceases to generate a blocking e.m.f.

Most of the warning circuits are required to operate both when the vehicle engine (not shown) is running and when the engine is stopped but the vehicle ignition is turned on (via the master switch 1 operated by the driver). However, for certain of the warning circuits operation during both running and non-running of the engine is inappropriate; in particular, the warning circuits for monitoring the operation of the generator and the engine oil pressure (warning lights S2 and S1 respectively) are only required to operate during running of the engine. Similarly operation of the oil-level warning circuit (warning light S4) is only appropriate when the engine is stopped. Accordingly in the monitoring apparatus now to be described, two controllable switching devices 4 and 11 are provided to ensure that the generator and oil-pressure warning circuits only operate when the engine is running, this condition being sensed for the oil-pressure warning circuit by the presence of the normal generator output and for the generator warning circuit by the presence of normal operating pressures in the engine oil circuit (as indicated by the monitoring switch associated with the oil-pressure warning circuit).

Considering now the circuit of the monitoring apparatus in more detail, the master or ignition switch 1 is connected on one side to the vehicle power supply (not shown) and on its other side via a supply lead 2 to the vehicle generator 3. One side of the generator 3 is earthed while the other side is taken to the control and regulating circuitry (not shown) of the vehicle power supply.

Each of the two above-mentioned switching devices 4 and 11 is constituted by a two-state electromagnetic relay provided with a respective control winding 5, 9 and a normally-closed contact set closed by a respective movable contact 6, 10. Both switching devices 4 and 11 are of the delayed action type.

A first one 4 of the switching devices has its control winding 5 interposed in the supply lead 2 connected to the generator 3 whereby when the generator is not operating current can flow via the winding 5 and generator 3 to earth to cause opening of the normally-closed contact set of the device 4; when the generator is running, its output prevents current flow through the winding 5 so that the contact set of the device is closed. When closed, the normally-closed contact set of the device 4 is arranged to activate the oil-pressure warning circuit 12 which is composed of the warning light S1 and an oil-pressure monitoring switch 8. One side of the oil pressure warning circuit 12 is connected via a contact 33 and a control winding 13 of a third switching device 24 to the supply lead 2, while the other side of the warning circuit is earthed. In the presence of engine oil pressures below a predetermined value the switch 8 is closed; above this predetermined pressure value the switch 8 is open.

The second switching device 11 has its control winding 9 connected between the supply lead 2 and (via a conductor 7) the non-earthed side of the oil-pressure monitoring switch 8. When the switch 8 is closed the winding 9 is energized which results in the opening of the normally-closed contact set of the device 11; when the switch 8 is open the winding is de-energized and the normally-closed contact set of the device 11 is closed which serves to activate the generator warning circuit 16 composed of the warning light S2 and its associated controlling means constituted by the generator 3 itself. Like the oil-pressure warning circuit 12, the generator warning circuit is connected to the supply lead 2 via the contact 33 and the control winding 13 of the third switching device 24.

The device 11 is further provided with a normally-open contact set arranged to be closed by the movable contact 10 upon energization of the winding 9. The closure of the normally-open contact set of the device 11 is arranged to activate the oil-level warning circuit 30 composed of the warning light S4 and an oil-level monitoring switch 34. The oil-level warning circuit is also connected via the contact 33 and the winding 13 to the supply lead 2.

In parallel with each of the warning lights S1, S2 S4 is a respective resistor R1, R2 and R4. A resistance 19 is placed in parallel with the winding 5 of the device 4.

The third switching device 24 is a single-pole two-way relay provided with a movable contact 23 which in the de-energized state of the device 24 is arranged to connect the supply lead 2 to a circuit 21 containing the green indicator light 22 whereby to energise the latter. Upon energization of the device 24, the contact 23 is arranged to connect the supply lead 2 to a circuit 31 including the repeater warning light 32. The device 24 also includes a second control winding 25. The winding 25 is arranged in a lighting warning circuit 26 which is connected between the outside lights switch 27 of the vehicle and a lights control unit 28 of known kind. The lighting warning circuit comprises a warning light S3 paralleled by a resistance R3.

A conductor 35 is connected to the supply lead 2 via the winding 13 and serves to supply power to a series of further warning circuits 36, 37, 38, 39, 40 each constituted by a respective warning light S5 to S9 and associated parallel resistor R5 to R9, and a respective monitoring switch 41 to 45.

A circuit branch 46 incorporating a monitoring switch 47 is connected to the warning circuit 36 and serves to monitor the position of the hand brake.

The warning circuits 36, 37, 38, 39, 40 are arranged to monitor respective components or systems installed in the motor vehicle, such as, for example, the doors (to check whether they are properly closed), the level of water in the radiator, the wearing of the brake pads, the oil level in the gearbox, and the brake fluid level.

Obviously the number of such further warning circuits which can be provided is unlimited, and depends solely on the number of components and systems it is desired to monitor.

Operation of the monitoring apparatus will now be described.

Prior to starting of the vehicle engine, the driver will insert the ignition key into the master switch 1 and turn on of the vehicle's power supply. In this condition the oil-pressure monitoring switch 8 will be closed and the generator 3 will provide a circuit path to earth so that both the first and second switching devices 4 and 11 will be energized. As a result the oil-pressure and generator warning circuits 12 and 16 will be deactivated while the oil-level warning circuit 32 will be activated. The further warning circuits 36 to 40 are also activated.

Provided that none of the components or systems monitored by the warning circuits 30 and 36 to 40 are malfunctioning, the monitoring switches 34, 41 to 45, and 47 will be open so that none of the warning lights will be energized and no current will be drawn from the supply lead 2 via the control winding 13. As a result, the third switching device remains de-energized causing the green indicator light 22 to light up indicating to the driver that all is well.

Should any one or more of the monitoring switches 34, 41 to 45, and 47 be closed, the corresponding warning light S4 to S9 will light up to indicate the malfunctioning of a monitored component or system. The current drawn by the illuminated warning light or lights will cause the third switching device 24 to operate to extinguish the indicator light 22 and light up the repeater warning light 32.

After the engine has been started up, then provided normal operating conditions prevail, the oil-pressure monitoring switch 8 will open and thereby cause the second switching device 11 to activate the generator warning circuit 16 and deactivate the oil-level warning circuit 30; at the same time the generator 3 will behave like an open switch and cause the first switching device to change into a state in which the oil-pressure warning circuit 12 is energised.

By arranging for the switching devices 4 and 11 to be of the delayed action type, the possibility of the non simultaneous "openings" of the switch 8 and the generator 3 resulting in the lighting up (even for a few seconds) of one of the warning lights S1 or S2 is avoided.

With the engine running, failure of the oil to reach its predetermined pressure level will be indicated by the illumination of the warning light S1, it being noted that this failure does not affect the initial activation of the relevant warning circuit. Failure of the generator 3 will be indicated by the illumination of the warning light S2 and, again, it will be noted that this failure does not affect activation of the relevant warning circuit.

The further warning circuits 36 to 40 remain activated during engine operation.

As in the condition of non operation of the engine, should any one of the warning lights of the activated warning circuits light up, the third switching device will change state to de-energize the green indicator light 22 and energise the repeater warning light 32.

Failure of either or both of the first and second switching devices 4 and 11 will be indicated by the lighting up of one or both of the warning lights S1 and S2 when the switch is initially turned on prior to starting of the engine.

The lighting warning circuit 26 operates in a manner similar to the further warning circuits 36 to 40 but is only activated when the lighting control switch 27 is closed.

The provision of the resistors R1 to R9 in parallel with the warning lights S1 to S9 respectively, serves a triple purpose:

(a) to ensure adequate excitation of the control winding of the third switching device 24 upon the occurrence of a malfunction in a monitored system or component;

(b) to reduce the possibility of uncertain functioning of the monitoring switches, due to inadequate flow of current passing between the switch contacts;

(c) to provide for the possibility of checking the condition of the light bulbs of the warning lights.

With respect to the latter purpose, by suitable choice of the resistance values of the resistors R1 to R9, these resistors by themselves can be arranged to pass sufficient current upon closure of their corresponding monitoring switches to cause operation of the switching device 24. In this case even if the light bulb of a warning light should become burnt out, extinction of the green indicator light 29 and illumination of the red warning light 32 would be ensured upon the malfunctioning of a monitored component or system. In such circumstances the driver would be immediately aware that a warning light bulb had burnt out since the repeater warning light would alone be lit up; the driver would then proceed to identify the burnt-out bulb which would also identify the malfunctioning giving rise to illumination of the repeater warning light 32.

The described monitoring apparatus can, of course be modified. Thus, for example, the warning lights S1 to S9 can be constituted by electronic photo-emitters (such as light emitting diodes) rather than ordinary bulbs.

I claim:

1. In a motor vehicle, monitoring apparatus for providing an indication of the malfunctioning of various components and systems of the vehicle, said apparatus comprising:

an oil-pressure warning circuit including a first warning light and an oil-pressure monitoring switch arranged to monitor the engine oil pressure, said monitoring switch being operative, whenever the oilpressure warning circuit is activated, to cause energization of said first warning light upon the engine oil pressure falling below a predetermined operating pressure, a generator warning circuit including a second warning light and control means controlling energization of said second warning light, the generator warning circuit being so arranged that when activated the non-operation of the vehicle's generator is indicated by energization of said second warning light, a first controllable switching device switchable between first and second states in the former of which said device is arranged to activate said oil-pressure warning circuit, the first switching device being controlled by the said control means of the generator warning circuit to be in its first state only during running of the vehicle engine as indicated by the operation of the generator, and a second controllable switching device switchable between first and second states in the former of which the second switching device is arranged to activate the said generator warning circuit, the second switching device being controlled by said oil-pressure monitoring switch to be in its first state only during running of the vehicle engine as indicated by the presence of said predetermined oil pressure.

2. Apparatus according to claim 1, further comprising an oil-level warning circuit connected to the said second controllable switching device such as to be activated when the latter is in its said second state corresponding to non-running of the engine, the oil-level warning circuit including a a third warning light, and an oil-level monitoring switch which when the oil-level warning circuit is activated is responsive to the engine oil level being below a preset value to cause energization of said third warning light.

3. Apparatus according to claim 1, wherein said control means of the generator warning circuit is constituted by the vehicie generator itself, said generator when not operating providing a closed circuit path which effectively becomes open upon operation of the generator.

4. Apparatus according to claim 1, wherein each of said first and second controllable switching devices comprises a respective electromagnetic relay provided with a normally-closed contact set and a control winding; the said contact set of the first device being connected in series with the said oil-pressure warning circuit across the vehicle power supply and the said control winding of the first device being connected across said supply via the said control means of the generator warning circuit, the said control means being operative to provide a circuit path whenever the said vehicle generator is not operating whereby to cause energization of the said control winding of the first device which in turn causes the latter to change from its first state, wherein its contact set is closed to activate said oil-pressure warning circuit, to its second state wherein its contact set is open; the said contact set of said second switching device being connected in series with the generator warning circuit across the vehicle power supply and the said control winding of the second device being connected across said supply via the oil-pressure monitoring switch, the said oil-pressure monitoring switch being arranged to provide a circuit path whenever the oil pressure is below said predetermined pressure whereby to cause energization of the said control winding of the second device which in turn causes the latter to change from its first state, wherein its contact set is closed to activate the generator warning circuit, to its second state wherein its contact set is open.

5. Apparatus according to claim 2, wherein said first controllable switching device includes a relay having a normally-open contact set connected in series with the oil-level warning circuit across said power supply.

6. Apparatus according to claim 1, wherein there is further provided an indicator light, and a third controllable switching device connected to said indicator light, said third device being responsive to the energization of any one or more of said warning lights to change from a first state in which said indicator light is energized, to a second state in which the indicator light is extinguished.

7. Apparatus according to claim 6, wherein there is further provided a repeater warning light connected to said third switching device, said third device being arranged when in its second state to cause energization of the repeater warning light.

8. Apparatus according to claim 6, wherein said third controllable switching device comprises an electromagnetic relay with a normally-closed contact set and a control winding, said contact set being connected in series with the said indicator lamp across the vehicle's power supply, and the said warning circuits being connected across said power supply via the control winding of the third switching device.

9. Apparatus according to claim 7, wherein the third switching device is provided with a relay having a normally-open contact set connected in series with said repeater warning lamp across the vehicle's power supply.

10. Apparatus according to claim 8, wherein a plurality of further warning circuits are connected in parallel with said oil-pressure and generator warning circuits.

11. Apparatus according to claim 8, wherein the warning light of each said warning circuit is paralleled by a resistor arranged to cause operation of said third switching device should said warning light fail when energized.

* * * * *